July 21, 1925.　　　　　　　　　　　　　　　　　　1,547,051
T. B. LAMBERT
BLANKET BRUSHING MACHINE
Filed Dec. 22, 1924　　　6 Sheets-Sheet 3

Inventor
Thomas B. Lambert,
By
Attorney

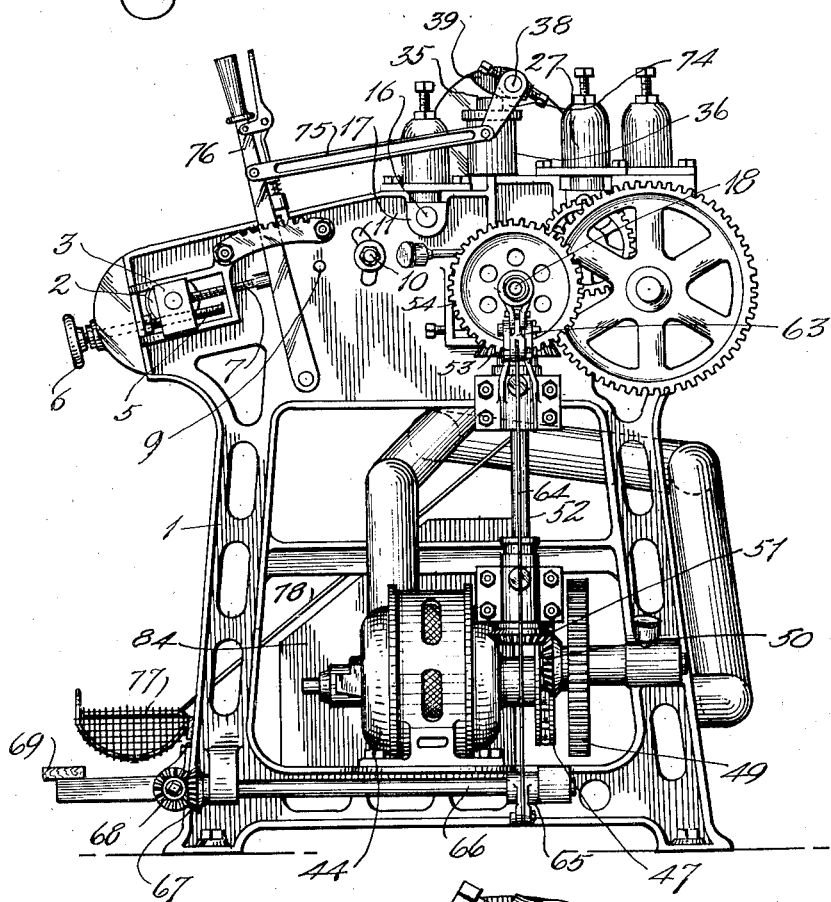
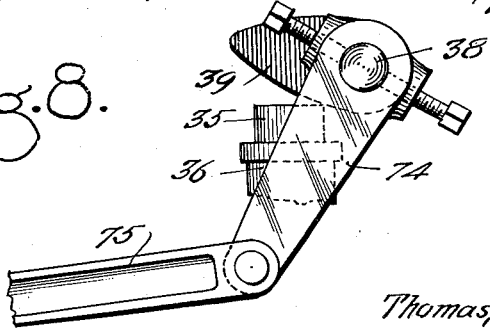

July 21, 1925.

T. B. LAMBERT

BLANKET BRUSHING MACHINE

Filed Dec. 22, 1924

Inventor
Thomas B. Lambert,

Attorney

July 21, 1925.

T. B. LAMBERT

BLANKET BRUSHING MACHINE

Filed Dec. 22, 1924

Inventor
Thomas B. Lambert,

By

Attorney

Patented July 21, 1925.

1,547,051

UNITED STATES PATENT OFFICE.

THOMAS B. LAMBERT, OF PORTLAND, OREGON, ASSIGNOR, BY MESNE ASSIGNMENTS, TO STERLING BLANKET MACHINERY COMPANY, OF SEATTLE, WASHINGTON.

BLANKET-BRUSHING MACHINE.

Application filed December 22, 1924. Serial No. 757,496.

*To all whom it may concern:*

Be it known that I, THOMAS B. LAMBERT, a citizen of the United States of America, residing at Portland, in the county of Multnomah and State of Oregon, have invented certain new and useful Improvements in Blanket-Brushing Machines, of which the following is a specification.

This invention relates to a nap brushing machine, particularly designed for use in restoring the nap to blankets after the latter have been washed or otherwise treated for cleaning.

A particular object of the present invention is the provision of means, whereby through a simple mechanical control, and at the will of the operator, the character of nap raised or restored on the blanket may be determined; and the nap brushing or raising effect of the machine may be varied or entirely dispensed with if and when desired, in order to treat a particular blanket in accordance with the requirement, it being understood that in worn spots where little or no nap is present, the machine might deleteriously affect the material of the blanket.

The invention is also directed to providing a feeding table on which the blanket is spread and overlying the delivery end of which is arranged a pressure roll for delivering the blanket in a smooth even manner to a series of spring wire supports arranged above the nap brush, pull-off rolls being arranged beyond the brush in the direction of blanket feed, with such pull-off rolls operating at a slightly higher speed than that of the feed tapes and pressure roller therefor, so that the blanket in its travel above the brush is held under slight tension to more effectively receive the operation of the brush.

A pressure member is arranged above the blanket in its travel above the brush, with such pressure member manually controlled to exert any desired pressure upon the blanket to force the same into contact with the brush, to vary the effect of the latter; the spring finger support serving to maintain the blanket properly spread during this pressure operation.

The invention is illustrated in the accompanying drawings, in which:

Fig. 4 is a similar view at the opposite end.

Fig. 8 is a broken end view of the operating bar and its connecting means.

Figure 1:
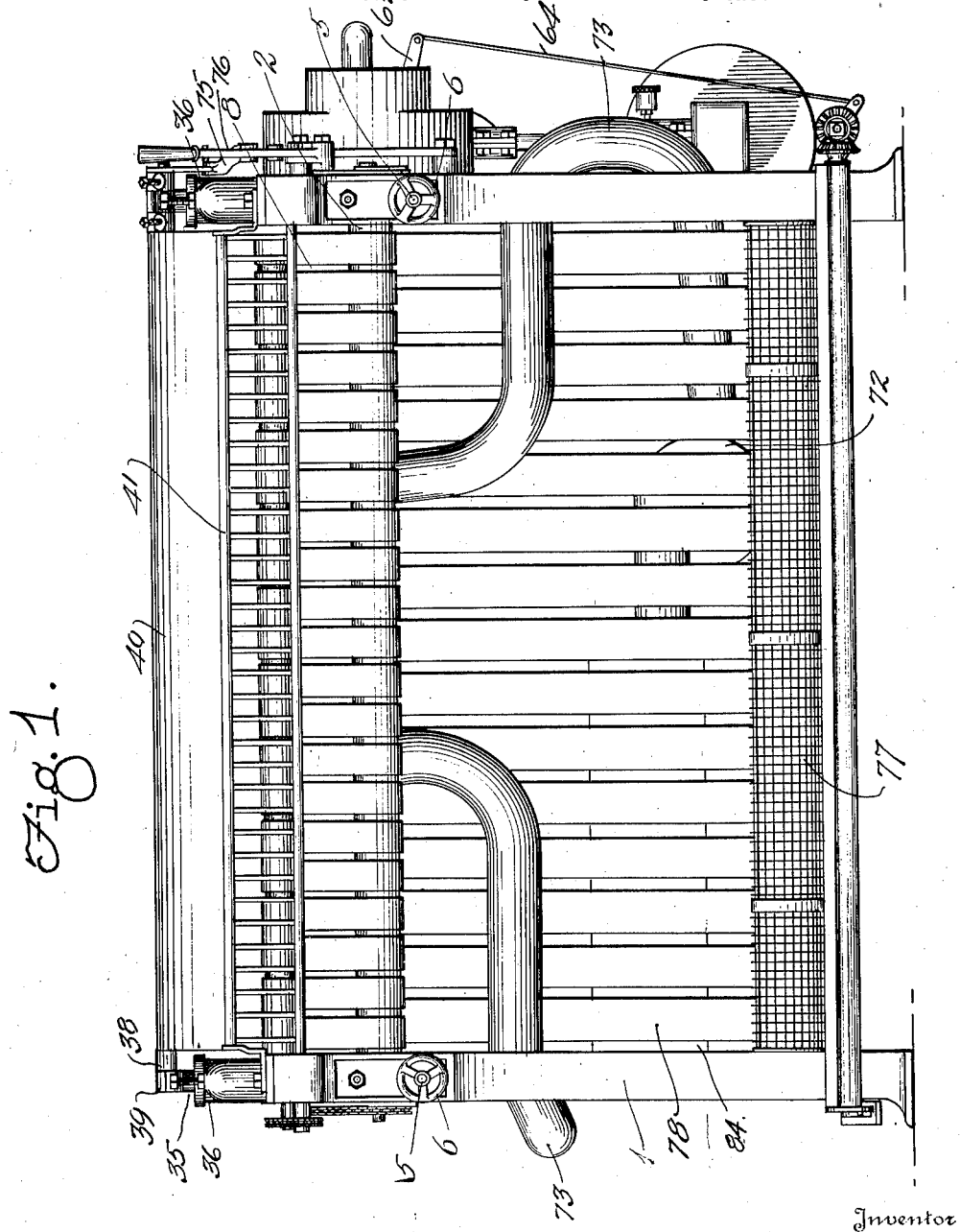
Fig. 1 is a view in front elevation of the machine.
Figure 2:
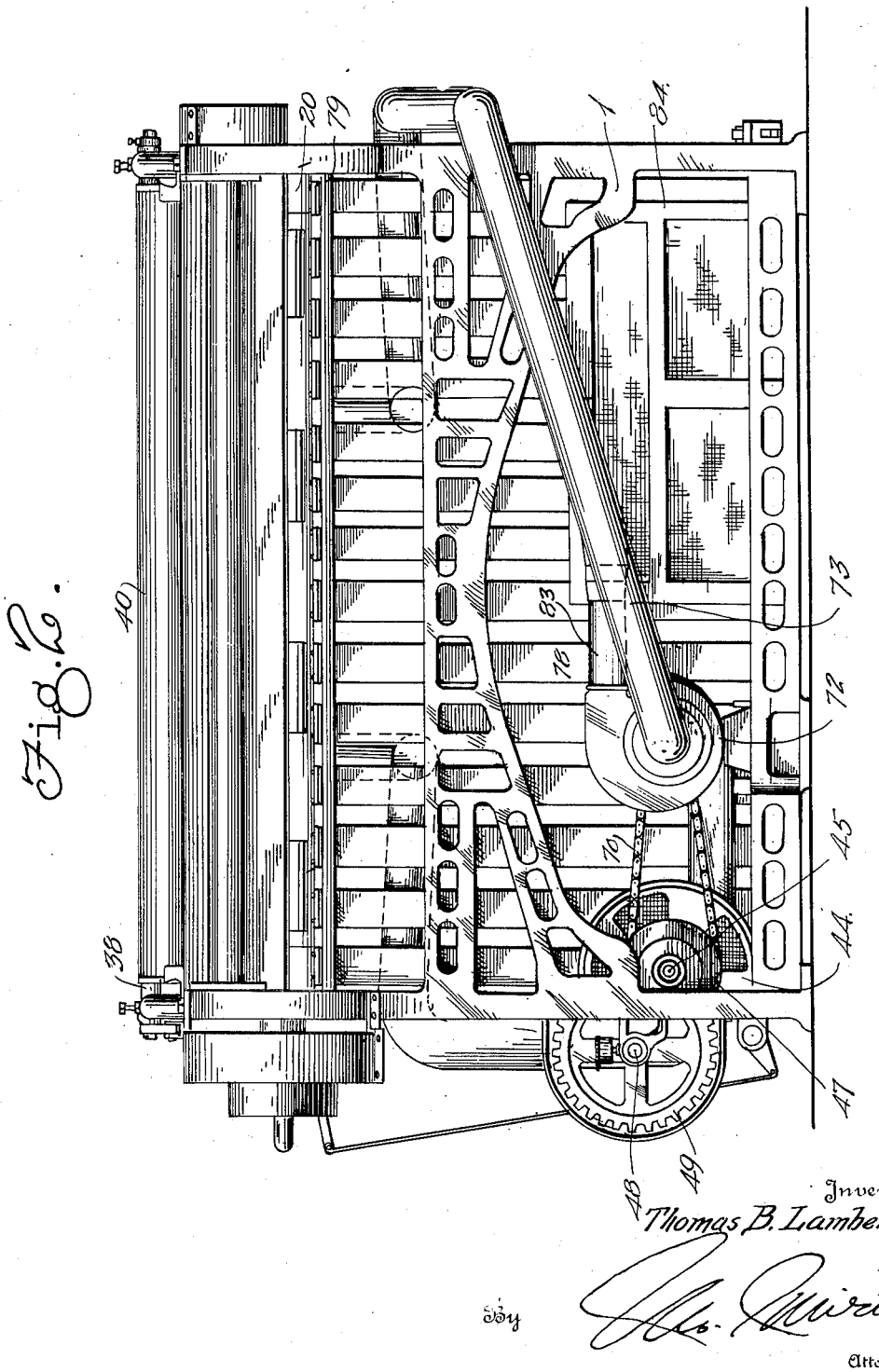
Fig. 2 is a side elevation of the same.

The improved nap brushing machine comprises a metallic frame structure 1, preferably of skeleton form, with the various parts arranged in appropriate design to support the operating parts. Transverse the frame at the forward or feed end is suitably mounted an initial feed roll 2, the journal of which is mounted in bearing blocks 3, slidable in a frame 4 on the main frame, and adjustable therein by means of a threaded shaft 5, having an operating handle 6, whereby the initial feed roll may be adjusted, a lock bolt 7 passing through the frame 4 and threaded therein and bearing against the block 3 to hold the block in adjusted position. In advance of and in line with the initial feed roll is a feed table 8, comprising a solid block of appropriate thickness and of board-like structure, centrally supported on trunnions 9 between the side bars of the main frame, and having bolts 10 projecting from the ends of the table and passing through slots 11 in the main frame, whereby the table may be tilted in proper feeding position and locked in such position in an obvious manner. A supporting block 12 underlies the forward end of the feed table, and bolts 13 are threaded therethrough to engage beneath the feed table to provide an adjustable and firm support for the delivery end of such table. Feed tapes 14 of endless form pass around the initial feed roll 2, and over and around the feed table, the forward end of the latter being rounded at 15 to facilitate the movement of the tape. A pressure feed roll 16 is supported in the main frame to overlie the tapes 14 at the delivery end of the feed table, this pressure roll being preferably mounted in spring-pressed bearings indicated at 17, the detailed construction of this feature being conventional and requiring no special illustration.

A brush shaft 18, provided with a suitable brush 19, is mounted in the main frame immediately in advance and slightly below the delivery end of the feed table, the operative plane of the ends of the brush bristles being slightly below the upper surface of the feed table at the delivery end thereof. Supported in the main frame and extending around the brush is a casing 20, one transverse edge of which terminates immediately adjacent the delivery end of the feed table, being there provided with a down turned blanket guiding lip 22, the casing 20 being provided with an integral section 21, which encircles the brush, terminating short of the wall of casing 20 remote from the delivery end of the feed table, to provide an opening 23 through which the refuse brushed from the blanket by the brush may find its way into the space 24, hereinafter termed the suction chamber between the section or brush shield 21 and the casing 20.

Immediately beyond the brush, upper and lower pull-off rolls 25 and 26 are mounted in suitable spring-pressed bearings 27 to receive the blanket between them after brush action thereon. The meeting planes of these rolls are substantially in horizontal alignment with the delivery end of the feed table, so that the blanket travels in a straight line, under normal conditions, from the delivery end of the feed table to the pull-off rolls, and as the blanket is held under some pressure at the delivery end of the feed table, and as the pull-off rolls, as will later appear, are driven at a speed slightly in excess of that permitted the pressure feed roll 16, it is apparent that the blanket between the delivery end of the table and the pull-off rolls is at all times under tension, to materially facilitate the nap brushing effect of the brush.

The blanket is provided with a spring support within the operative plane of the brush, comprising a series of spring rods 28 which are fixed in the casing 20 below the delivery end of the feed table and extend therefrom at a slight upward incline with their ends resting freely upon the opposing edge of the casing 20. The spring rods are so positioned that the bristles of the brush extend therebetween in normal operation, these supports defining a means for maintaining the blanket in more or less spread flat relation in the depression of said blanket under the action of the pressure member now to be described.

Figure 5:
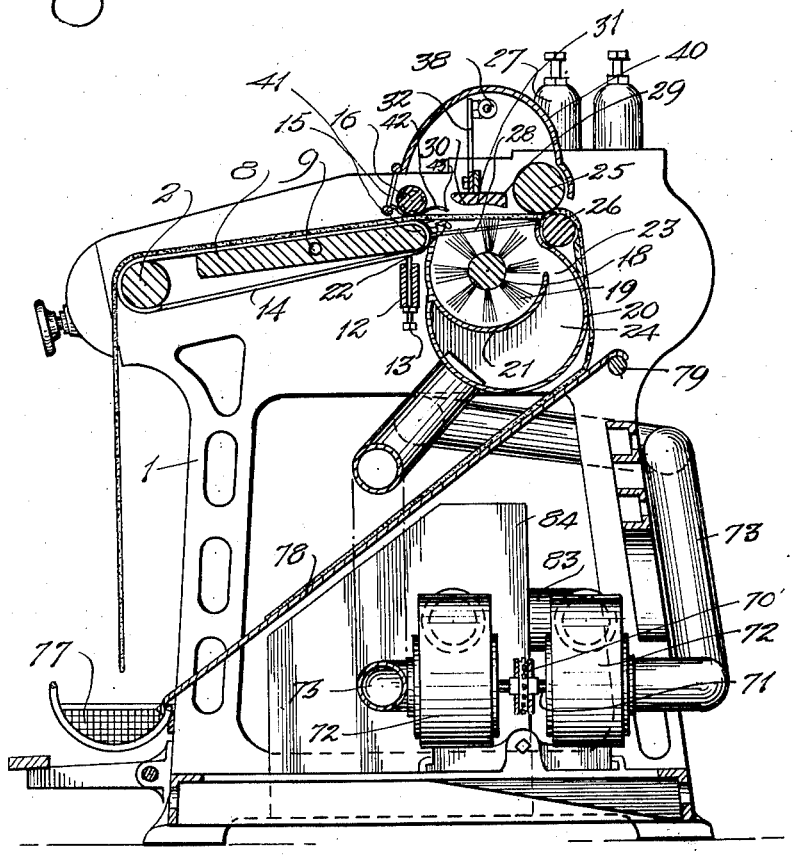
Fig. 5 is a vertical central section through the machine.
Figure 6:
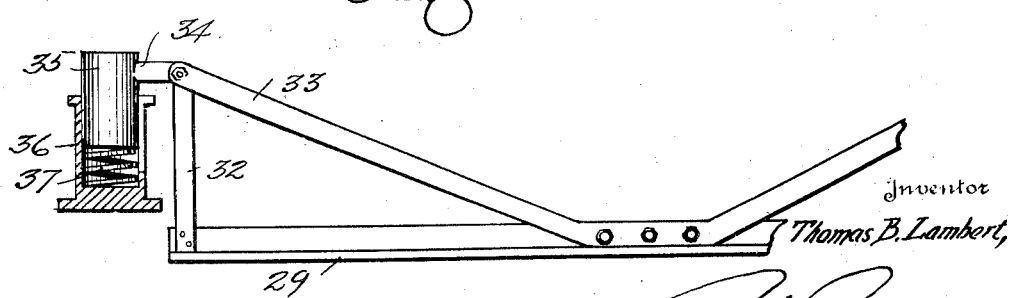
Fig. 6 is a view in elevation, partly in section, showing the mounting of the presser member.
Figure 9:
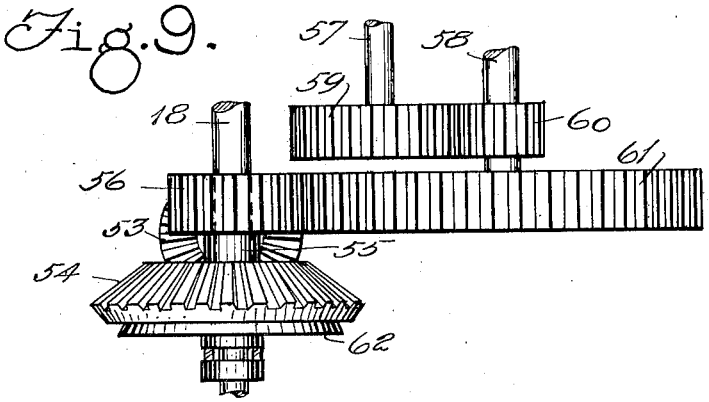
Fig. 9 is a broken plan showing the drive means between the brush shaft and pull-off rolls.
Figure 11:
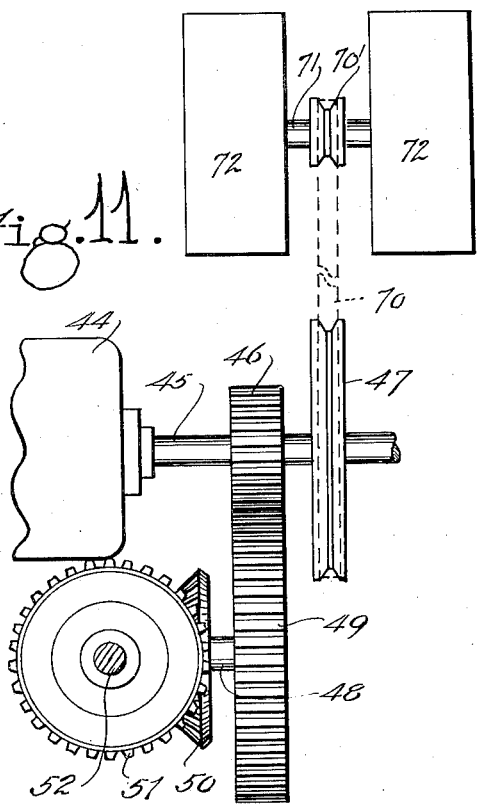
Fig. 11 is a detail showing the motor drive connections.
Figure 10:
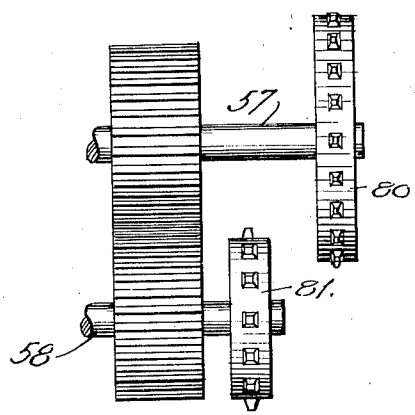
Fig. 10 is a detail showing the driving connections between the pull-off rolls and the pressure feed roll and initial feed roll.

Immediately above the blanket is arranged a pressure member 29, the lower surface of which is curved substantially in the manner indicated at 30 in Fig. 5, the curvature facilitating the feeding of the blanket beneath the pressure member when the latter is in operative position, and the curved face of the pressure member further presenting an upwardly curved portion 31 into which the blanket fits when the pressure member is operative to provide a rounded surface more or less concentric with the operative plane of the brush, to thereby increase the surface of the blanket which is subjected to the action of the brush when the pressure member is depressed, as compared with the straight or flat relation of the blanket. As shown in Fig. 6, the pressure member is carried at the lower ends of uprights 32 interbraced at 33 and having lateral bars 34 connected to plungers 35 operating in cylinders 36 mounted on the frame and containing springs 37 underlying the plungers 35. An operating bar 38 overlies the plungers 35 and is provided immediately thereabove with cams 39 so that in the operation of said bar in one direction, the cams serve to depress the plungers and thereby the pressure member against the tension of the springs 37, operation of the bar in the opposite direction permitting the springs to return the pressure member toward inoperative position.

A guard plate 40 is arranged to overlie the operative parts of the pressure member, with one edge overlying the upper pull-off roll, and the other edge extending to and slightly in advance of the pressure feed roll 16. A guard member is arranged immediately in advance of the pressure feed roll 16, comprising a skeleton bar frame 41 pivotally supported at the lower end between the bars of the main frame and resting against the guard plate 40. The lower bar of the frame 41 carries spring strips 42, which extend forwardly into annular channels in the pressure feed roll 16 and extend in advance of the pressure feed roll in curved extensions 43 to prevent the blanket in its feeding movement from being deflected upwardly between the pressure feed roll and the pressure member.

The driving mechanisms for the various parts include a motor 44 supported on the main frame with its shaft 45 provided with a pinion 46, and a sprocket or belt wheel 47. An auxiliary shaft 48 is mounted in the frame and provided with a gear 49, in mesh with the gear 46 and with a bevel pinion 50 in mesh with a bevel pinion 51 on an upstanding or vertical shaft 52. This latter shaft extends vertically in line with the brush shaft 18 being below such shaft provided with a bevel pinion 53 operating a bevel pinion 54 mounted upon a hollow shaft 55 loosely arranged upon the brush shaft 18, the hollow shaft 55 being provided with a pinion 56. The shafts 57 and 58 of the upper and lower pull-off rolls 25, 26, are provided with intermeshing pinions 59, 60, the shaft 58 being further provided with a gear 61 in mesh with the pinion 56.

The brush shaft 18 is provided beyond the bevel pinion 54 with a clutch member 62 keyed upon the shaft 18 and having cone clutching cooperation with the bevel pinion 54. The clutch 62 is operated through the medium of a lever 63 connected to a rod 64 with the latter secured to an arm 65 mounted upon a shaft 66 arranged in the lower portion of the main frame and formed at its forward end with a bevel pinion 67 to be engaged by a bevel pinion 68 operated through a foot member 69 extending transverse the main frame at the forward portion thereof. Thus by controlling the clutch, the brush may be caused to be operated or not operated at will, the pull-off rolls being continuously driven as long as the motor is in operation, without regard to the operation of the brush. The sprocket 47 on the motor shaft is connected by a chain to a sprocket 70 on a shaft 71 operating suction devices 72 of any conventional or desired type, these suction devices being connected by pipes 73 with the suction chamber 24.

The shaft 38 for controlling the pressure member is connected by an arm 74 to a bar 75, which is in turn connected to a hand lever 76 having the usual locking dog and segment for fixing the lever in desired position. By means of this lever, the pressure member may obviously be moved downward to any desired extent to thereby force the blanket onto the brush with the force necessary to brush and raise the nap, as may be determined by the condition of the blanket at that particular portion being operated upon by the brush.

Arranged at the front of the machine immediately above the foot member 69 is a receptacle 77, here shown in the form of a wire basket, and leading from this receptacle, is a series of upwardly and rearwardly inclined metal strips 78, the upper ends of which rest on a support 79 in rear of the casing 20 and below the same, these strips forming a guide for the return of the brushed blanket to the basket.

In operation, a blanket is spread upon the feeding tapes in a flat even manner and fed by the tapes beneath the pressure feed roll 16. By reason of the directing means provided in the spring tongues 43, the lip 15, and the rods 28 the blanket is fed across the brush, the pressure member having been moved downwardly to the desired extent to press the blanket into contact with the brush to cause the latter to operate on the nap to a degree indicated by the condition of the particular blanket. The free end of the blanket is finally fed between the pull-off rolls, following which an appreciable degree of tension is exerted on that portion of the blanket passing above the brush. This is important, for if a part of the blanket is worn, that is, entirely free of nap section, under which circumstances the action of the brush might seriously interfere with the blanket fabric, the pressure member is permitted to withdraw, the tension exerted by the pull-off rolls raises the blanket substantially free of contact with the brush, and the latter is prevented from roughening or breaking the fibers of the blanket. The blanket beyond the pull-off rolls is directed by gravity into the basket 77 in a regular even manner.

The improved machine provides a means for raising the nap on the blanket or like material after the latter has been washed or otherwise cleaned, in order that the completed article may have the fluffy woolly appearance of a new article.

Figure 3:
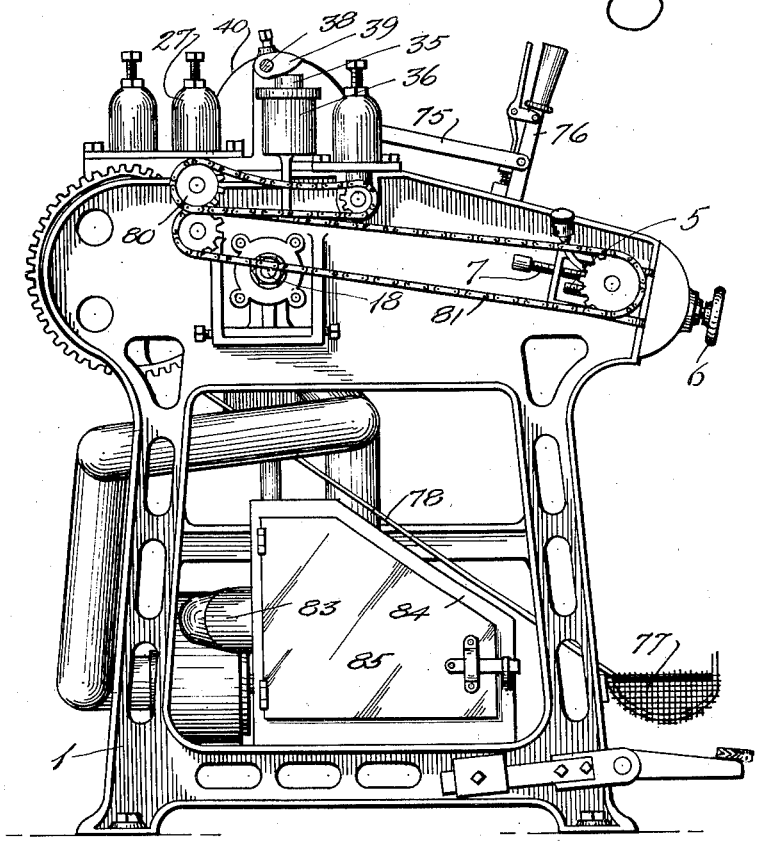
Fig. 3 is an end elevation of the same.
Figure 7:
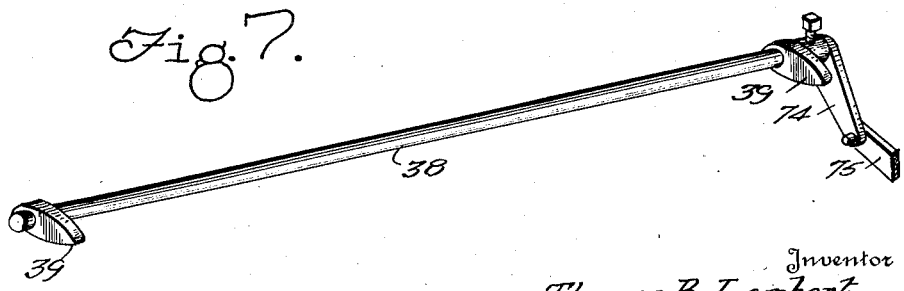
Fig. 7 is a perspective view of the operating bar for the presser member.

Obviously, the feed roll 2 and the pressure feed roll 16 may be driven in any convenient manner from the driving parts described, though for the purpose of an operative showing, I have indicated in Fig. 3, a sprocket chain drive 80 from the upper pull-off roll shaft to the pressure feed roll 16, and a similar chain sprocket drive 81 from the lower pull-off roll to the feed roll 2. If desired, an outlet 83 from the suction devices may lead into a receptacle 84 suitably mounted in the main frame, to provide for the accumulation of the material brushed from the blanket by the brush. The receptacle may have a door 85 to provide for removing the refuse.

What is claimed as new, is:

1. In a blanket brushing machine, a framework, a brush mounted for rotation therein, a blanket feeding means leading to the brush, a pressure roll cooperating with the feeding means immediately in advance of the brush, take-away rolls cooperating with the blanket immediately following the brush, said take-away rolls being operated at a speed slightly exceeding that of the feeding speed of the blanket to exert a slight tension on the blanket throughout the brush area, a flexible spring blanket support through which the bristles of the brush extend, a pressure member shaped on its operative face to substantially conform to the contour of the brush and means acting on said member to force the blanket into cooperation with said brush and support at any predetermined pressure.

2. In a blanket brushing machine, a framework, a brush mounted for rotation therein, a blanket feeding means arranged in advance of the brush, a blanket take-off means arranged beyond the brush, a suction casing within which the brush operates, said casing having an open mouth through which the brush operatively extends, and a blanket support comprising a series of substantially parallel spring members fixed at one edge to the casing and resting loosely upon the opposite edge of the casing, and a pressure member cooperating at will and under predetermined pressure with the blanket on said support.

3. In a blanket brushing machine, a framework, a brush mounted for rotation therein, a blanket feeding means arranged in advance of the brush, a blanket take-off means arranged beyond the brush, a suction casing open at the top and surrounding the brush, an open top suction casing positioned below said feeding and take-off means and partially surrounding said brush, a shield extending from one side of the casing, under the brush, and terminating in a line adjacent the opposite side of the casing to define a narrow suction opening, and suction means cooperating with said casing below said shield.

4. In a blanket brushing machine, a main frame, a feed roll mounted in the forward portion thereof, a feed table arranged in rear and in line with the feed roll, feeding tapes passing endlessly over the feed roll and feed table, the delivery end of the feed table being rounded to provide for a proper movement of the tapes, a feed pressure roll arranged above the delivery end of the feed table, a guard arranged in advance of the feed pressure roll, and spring fingers carried by the guard and extended in advance of the delivery end of the feed table, said fingers seating in annular channels in the feed pressure roll between the tapes.

5. In a blanket brushing machine, a feeding means including a series of endless tapes, a brush operating in advance of the feeding means, pull-off rolls arranged beyond the brush, a pressure member operative above the brush and having its lower surface formed with a concavity to increase the effective brushed length of the blanket when the pressure member is in operative contact therewith, a frame carrying the pressure member, spring-pressed plungers supporting the frame, a manually operable shaft overlying the plungers, and cams on the shaft to engage and depress the plungers against the tension of the springs to thereby operate the pressure member.

In testimony whereof I affix my signature.

THOMAS B. LAMBERT.